United States Patent [19]

Konig

[11] 4,165,053

[45] Aug. 21, 1979

[54] CABLE DRUM FOR AUTOMATIC REWINDING OF A CABLE

[76] Inventor: Heinz König, Obentrautstrasse 33, D-1000 Berlin 61, Fed. Rep. of Germany

[21] Appl. No.: 872,311

[22] Filed: Jan. 25, 1978

[51] Int. Cl.² .............................................. B65H 75/48
[52] U.S. Cl. .................................................. 242/107.1
[58] Field of Search ............ 242/107.1, 107.11, 107.12, 242/107.13, 107.15, 100.1, 86.1, 107, 107.2–107.7; 254/178, 167

[56] References Cited

U.S. PATENT DOCUMENTS

| 452,799 | 5/1891 | Matteson | 242/107.11 |
| 1,983,565 | 12/1934 | Replogle | 242/100.1 |
| 2,678,779 | 5/1954 | Bellmer | 242/107.1 |
| 2,926,865 | 3/1960 | Humphreys | 242/107.13 |

Primary Examiner—Harvey C. Hornsby
Assistant Examiner—John M. Jillions
Attorney, Agent, or Firm—Max Fogiel

[57] ABSTRACT

A cable drum for the automatic rewinding of a cable in which two separate winding areas are located on a shaft loaded with the force of a restoring spring. The cable is fixed by a slot in the winding areas in a disc-shaped separating wall which is common to the winding areas. The shaft is perpendicular to a rotary disc or bushing of a two-part spring housing and engages the rotary disc or bushing in a form-locked manner. The shaft is held in a bearing of a stationary part of the spring housing. This stationary part holds feed-out guides for the two ends of the cable. The stationary part of the spring housing, furthermore, is expanded to form a cylindrical wall which bounds the winding areas on a side and partially extending over the cable drum discs fixed on the shaft. A cover is detachably fastened on this cylindrical wall and extends over the remaining portion of the cable drum discs. The cylindrical wall contains the feedout guide which is open on the face side for one cable end, and the cover contains the feed-out guide for the other cable end. The shaft, moreover, engages the bushing in a form-locked manner, and the bushing is connected with one end of the spring located in the spring housing and is rotatably mounted in the stationary part which is attached to the other end of the spring. The spring may be in the form of a spiral spring.

9 Claims, 2 Drawing Figures

CABLE DRUM FOR AUTOMATIC REWINDING OF A CABLE

BACKGROUND OF THE INVENTION

The present invention relates to a cable drum for the automatic rewinding of cables.

Many devices require for rational use a continuously varying cable length. This applies to telephone sets with their wires or devices connected to the public power line which are used flexibly. If they are provided with the maximum cable length needed, there frequently arises the problem that with shorter distances between outlet and device, the cable tends to become twisted. In addition, there is danger that the cable lying on the floor might be damaged. Therefore it is useful to wind up the superfluous cable lengths on a cable drum. Particularly simple handling of a cable can be achieved by having the cable not required to be automatically wound on the cable drum.

There is already known in the art a cable drum for the automatic rewinding of a cable where two separate winding areas, located on a shaft loaded with a return spring, and a slot, fixing the cable in the winding areas, are provided in the disc-shaped separating wall common to the winding areas. The return spring acts relative to an axis passing through the shaft; this axis is provided on the shaft outside with two wire loops to guide the cable to be wound. In order to insert the cable, the return spring must be preloaded by suitably rotating the shaft relative to the wire loops. Only then can the cable be inserted in the slot of the disc-shaped separating wall of the winding areas, and be wound with slow release of the shaft in two wound packages.

The known cable drum has various disadvantages. Insertion of the cable requires considerable manual dexterity since the return spring must first be pre-loaded and then slowly released after fixing the cable in the winding areas. If the return spring has not been sufficiently preloaded, the cable is not completely wound up and there is danger that windings of the cable package slip out of the winding areas. This may block the cable drum and, in the extreme case, destroy (damage) the cable. In addition, the known cable drum can be rationally used only for small cable lengths, since otherwise the preloading of the return spring by hand becomes unreasonable or even impossible due to the increasing spring force.

It is, therefore, an object of the present invention to provide, while avoiding the above disadvantages, a cable drum for the automatic rewinding of a cable to be installed without special skill by laymen on a cable. The cable drum is adapted to cables of great lengths and still reliably protects the cable in the wound state against damage or sliding-off of the cable wound packages. In addition, quick replacement by other cable drums is to be possible.

Another object of the present invention is to provide an arrangement of the foregoing character which is substantially simple in construction and may be economically fabricated.

A further object of the present invention is to provide a cable drum, as described, which may be readily maintained in service and which has a substantially long operating life.

SUMMARY OF THE INVENTION

The objects of the present invention are achieved by providing that the shaft of the cable drum is perpendicular to the rotary disc of a two-part spring housing, and engages this rotary disc in a form-locked manner. It is also guided in a bearing of the stationary portion, with this stationary portion carrying the feedout guides of the two cable ends.

The cable whose one end leads to a fixed outlet and whose other end leads to the attached device (appliance) can be inserted in the middle between these two connections into the known insertion slot of the disc dividing the winding areas; now, the two cable ends (sections) thus separated can be placed by simple winding in the two winding areas. After the cable has been sufficiently wound up in this manner, each of the two ends is placed into the associate feed-out guide which is diametrically opposite the other one. By pulling on the cable, the cable ends are fed out, with continuing load on the return spring inside the spring housing. If the pull (tension) is interrupted, the cable ends are automatically wound.

If the cable, which is freely accessible from the side, is to be protected against external influence, the fixed portion of the spring housing, in accordance with a further improvement of the invention, is expanded into a cylinder wall bounding the winding areas on the side and partially extending over the cable drum discs fixed on the shaft. A cover extending over the remainder of the cable drum discs is detachably fastened to this cylinder wall. The cylinder wall as a guide slot, open on the face side, for one cable end and the cover has a guide slot, open on the face side, for the other cable end.

In order to keep the winding areas freely accessible and to conveniently wind the cable by hand, without having to rotate three connected cable drum discs against the action of the return spring, the shaft on which the three cable drum discs are fastened, is made to engage a bushing. This bushing, in turn, is solidly connected to one end of a spiral spring located in the spring housing and is rotatably mounted in the stationary portion which is engaged by the other end of the spiral spring. In order to wind the cable in the manner described, the shaft with the three cable drum discs is pulled from the bushing; the cable is wound in two separately wound packages, each containing a cable end, and then the shaft is inserted into the bushing of the spring housing. Then the two cable ends must be inserted into the associated guide slot. The cover is thereafter screwed on, and the cable drum is ready for use.

As already mentioned, the guide slots are located diametrically opposite to each other.

One or both sides of the cable drum housing have a very smooth surface so that the cable drum, lying on the ground, can be easily moved without interfering with the cable.

A particular advantage of the cable drum in accordance with the present invention is that it is now possible to store the shaft with the cable drum discs and a cable wound thereon. In this manner, one can store cables of various dimensions and insert them at any time into the cable drum housing in accordance with the invention, in order to have the desired use.

The novel features which are considered as characteristic for the invention are set forth in particular in the appended claims. The invention itself, however, both as to its construction and its method of operation, together

DESCRIPTION OF THE PREFERRED EMBODIMENTS

Figure 1:
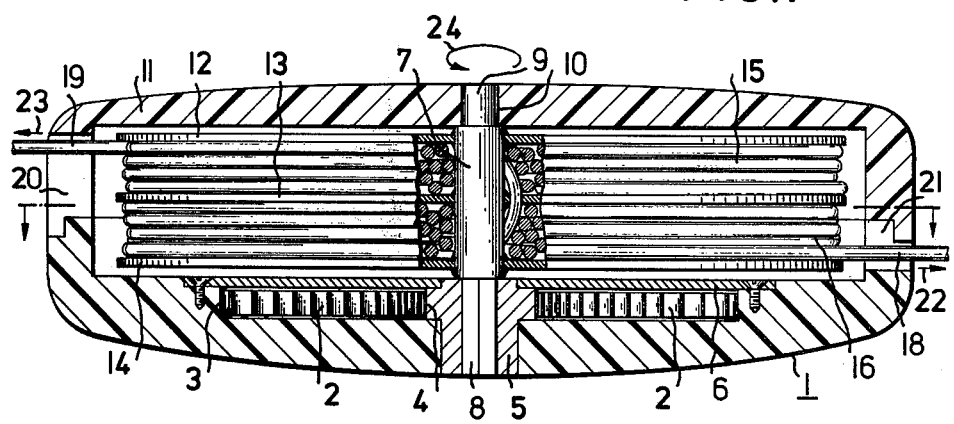
FIG. 1 shows a lengthwise section through the cable drum.

Referring to FIG. 1, the cable drum whose winding areas 15 and 16 are formed between cable drum discs 12, 13 and 14, comprises the stationary portion 1, whose cylindrical bore contains the spiral spring 2 in such a way that its outer end 3 engages the stationary portion 1 and its inner end 4 engages bushing 5 which is located in the outer portion 1 and in the plate 6 closing the borehole of this portion 1.

Shaft 7 with its outside hexagon 8 is inserted in the bushing 5 which has an internal hexagon profile so that there is formlocked engagement while shaft 7 with its upper trunnion 9 is held in bore 10 of cover 11.

Shaft 7 mounts the three cable drum discs 12, 13 and 14 so that the winding areas 15 and 16 are formed between them.

Figure 2:
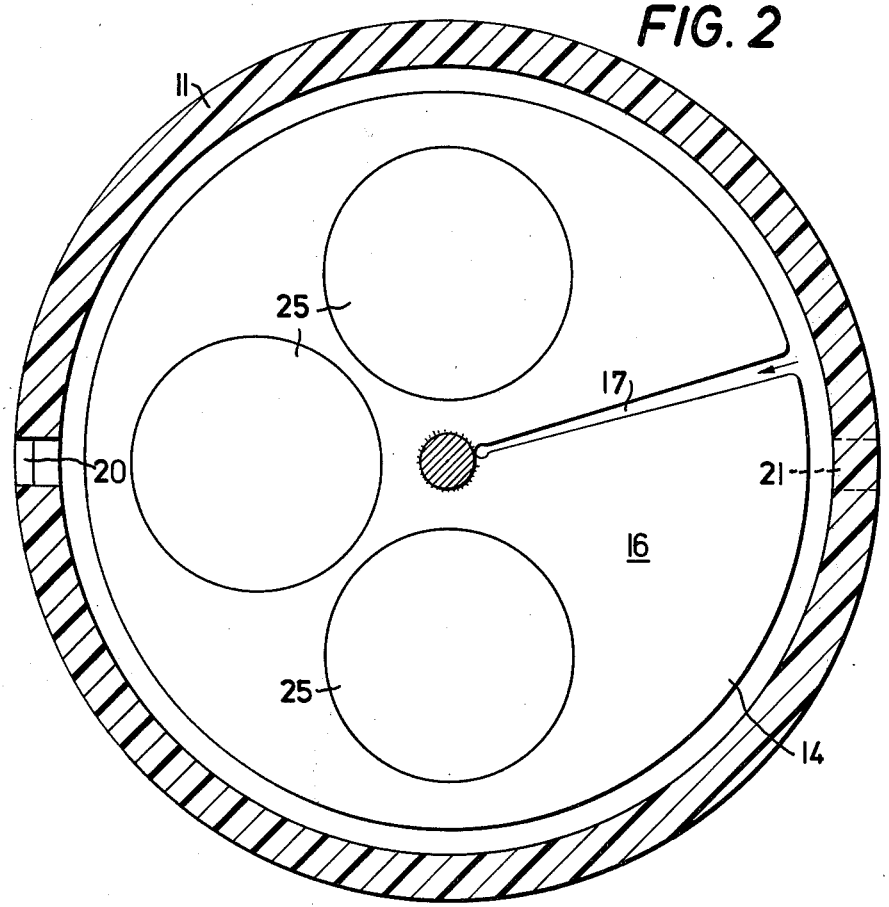
FIG. 2 shows a cross-section through the cable drum of FIG. 1.

The center cable drum disc 13 comprises, as shown by the cross-section of FIG. 2, a holding slot 17 which tapers off towards the inside and ends in a circular opening. At the start of the winding, the center (middle) of the cable is inserted into this guide slot, so that a cable end 18 or 19 extends to the right and left, respectively, of the middle cable drum disc 13. Earlier, the shaft 7 including the cable drum discs 12 to 14 were pulled from the connection with bushing 5. The cable ends 19 and 18 emanating from the slot are shown in FIG. 1 since there the cable packages were shown broken off. Then the cable packages 18 and 19 running in the same direction are wound in the same direction, and, after the packages are completed, led out in the opposite direction, through the guide slots 20 and 21. Then cover 11 is placed on the stationary portion and screwed on or fastened otherwise.

Now the cable drum in accordance with the invention is ready for use.

If a pull is exerted on cable ends 18 and 19 in the direction of the arrows 22 and 23 shown there, shaft 7 rotates in the direction of arrow 24 and tightens the spiral spring 2, storing in it the required restoring force for the cable ends.

FIG. 2 which is merely a cross-section through the cable drum housing, leaving out the cable package, further shows that the cable drum discs 12, 13 and 14 have circular holes 25 to save weight.

In this embodiment, shaft 7 is shown as a smooth cylindrical part. However, it is very expedient to strengthen (reinforce) this shaft a little and, starting with the area immediately adjacent to the holding slot 17 which is located inside the cable disc 13, to bring the two exiting cable ends in a thread-like groove directly to the two outer cable drum discs 12 and 14. This prevents the first windings of the cable packages from being fed out via the exit areas of the cable roll ends from the holding slot 17 and from being pressed out of round. When the shaft 7 is designed in that manner, the cable packages turn out completely round and cylindrical.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A cable drum for automatically rewinding of a cable comprising: restoring spring; a housing holding said restoring spring; a shaft; three disc-shaped walls fastened to said shaft, said shaft extending perpendicular to said walls, said walls defining two winding area means, one of said disc-shaped separating walls being common to both winding areas and having a holding slot for fixing the cable in place; a bushing rotatably carried within a bottom portion of said housing and having a central opening of non-circular cross-section receiving an axially extending protrusion of said shaft having complementary cross-section, an upper portion of the housing being circumferentially connected to said bottom portion, said shaft having an upper trunnion rotatably held in a bore in said upper portion and which completes said bottom portion to form a cylindrically hollow body having a smooth surface; feed-out guide means located within marginal zones of said bottom portion and said upper portion of the housing, one end of said restoring spring being attached to said bottom portion and the other end of said spring being connected to said bushing; said disc-shaped walls comprising cable drum discs connected rigidly to said shaft, said cable drum being prepared for operation by separating the housing portions and removing said cable drum discs, a middle part of the cable to be wound being thereafter pressed into said slot so that a part of the cable is always received by one of said winding area means, one cable end projecting through one exit opening and the other cable end projecting through another exit opening when said cable is substantially wound on the drum so that said cable drum discs are inserted into said bottom portion of the housing, said cable drum being operative after said protrusion of said shaft is inserted into said opening of said bushing and said housing portions are connected.

2. A cable drum as defined in claim 1 wherein said holding slot is expanded for forming a circle at its end adjacent to said shaft.

3. A cable drum as defined in claim 1 wherein all parts except said spring are comprised of synthetic material.

4. A cable drum as defined in claim 1 wherein surfaces of said housing are substantially smooth.

5. A cable drum as defined in claim 1 wherein said guide means comprises slots open on one side and facing each other diametrically.

6. A cable drum as defined in claim 1 wherein said upper portion and said bottom portion are connected by screw thread means.

7. A cable drum as defined in claim 1 wherein said holding slot extends radially with said cable drum disc so that said holding slot is directed perpendicular to the pulling direction of the cable.

8. A cable drum as defined in claim 1 wherein said guide means comprises slots open on one side and facing each other diametrically, said upper portion and said bottom portion being connected by screw thread means, said holding slot extending radially with said cable drum disks so that said holding slot is directed perpendicular to the pulling direction of the cable, said holding slot communicating with a circular-shaped opening at its end adjacent to said shaft, all parts except said spring being comprised of synthetic material; surfaces of said housing being substantially smooth, said cable drum being adapted for connecting wires of telephone sets.

9. A cable drum as defined in claim 1 wherein said feed-out guide means comprises feed-out guides; one feed-out guide being open for one cable end, said upper portion having another feed-out guide for the other cable end.

* * * * *